United States Patent [19]

Hoshino

[11] Patent Number: 5,283,926
[45] Date of Patent: Feb. 8, 1994

[54] WASHER HOSE ARRANGEMENT IN WIPER ARM DEVICE

[75] Inventor: Takashi Hoshino, Isesaki, Japan

[73] Assignee: Mitsuba Electric Manufacturing Co., Ltd., Kiryo, Japan

[21] Appl. No.: 957,165

[22] Filed: Oct. 7, 1992

[30] Foreign Application Priority Data

Jan. 22, 1992 [JP] Japan .................................. 4-6661

[51] Int. Cl.$^5$ ............................. B60S 1/46; B60S 1/32; B60S 1/32
[52] U.S. Cl. ............................. 15/250.04; 15/250.35; 15/250.34
[58] Field of Search ........................ 15/250.01–250.04, 15/250.34, 250.35, 250.002, 250.003; 239/284.1, 284.2

[56] References Cited

U.S. PATENT DOCUMENTS

| | | | |
|---|---|---|---|
| 2,648,865 | 8/1953 | Gordon et al. | 15/250.04 |
| 3,422,484 | 1/1969 | Carpenter | 15/250.04 |
| 3,906,582 | 9/1975 | Graczyk et al. | 15/250.04 |
| 3,916,473 | 11/1975 | Williams | 15/250.04 |
| 4,502,178 | 3/1985 | Ragot et al. | 15/250.04 |

FOREIGN PATENT DOCUMENTS

| | | | |
|---|---|---|---|
| 544311 | 1/1956 | Belgium | 15/250.04 |
| 2237558 | 2/1973 | Fed. Rep. of Germany | 15/250.04 |
| 3532848 | 1/1987 | Fed. Rep. of Germany | 15/250.04 |
| 1228171 | 3/1960 | France | 15/250.04 |
| 1295138 | 4/1962 | France | 15/250.04 |
| 2607766 | 6/1988 | France | 15/250.35 |
| 9010561 | 9/1990 | PCT Int'l Appl. | 15/250.34 |
| WO91/08933 | 6/1991 | PCT Int'l Appl. | |
| 9205053 | 4/1992 | PCT Int'l Appl. | 15/250.42 |
| 462642 | 10/1968 | Switzerland | 15/250.04 |

Primary Examiner—Harvey C. Hornsby
Assistant Examiner—Gary K. Graham
Attorney, Agent, or Firm—Oliff & Berridge

[57] ABSTRACT

A wiper arm device includes a wiper arm fixed at its base end to a wiper shaft which protrudes from a vehicle body. A washer nozzle provided on the wiper arm discharges washer liquid towards the windshield of the vehicle. A washer hose supplies the washer liquid to the washer nozzle and has one end protruding from a position which is near the wiper shaft and which is clear of the oscillation stroke of the wiper arm. The washer hose extends along the wiper arm so as to be connected at its other end to the washer nozzle. An arm cover is provided on the base end of the wiper arm so as to cover the end portion of the washer hose protruding from the vehicle body.

7 Claims, 4 Drawing Sheets

WASHER HOSE ARRANGEMENT IN WIPER ARM DEVICE

BACKGROUND OF THE INVENTION

1. Field of the Invention

The present invention relates to a washer hose arrangement in a wiper arm device, and more specifically to a washer hose arrangement having a wiper arm cover.

2. Description of the Related Art

A conventional wiper device has a wiper arm connected with a window-washer device which discharges washer liquid towards a windshield. This discharging operation is typically performed in concert with a wiping operation of the wiper arm. Conventional window-washer devices discharge washer liquid to a washer nozzle which is fixedly mounted on the vehicle body in such a manner that the discharging post of the nozzle faces the windshield. The water is sprayed on the windshield by pressure-feeding washer liquid from a washer tank through the washer nozzle. However, in the conventional window-washer devices, washer liquid is discharged towards a predetermined position on the windshield, and effective spraying of washer liquid over a wide area of the windshield cannot be obtained. In addition, problems arise in that washer liquid discharged during high speed driving is deflected by wind pressure and cannot reach the predetermined position of the windshield.

Hence, it has been proposed to dispose the washer nozzle 10 on the wiper arm 1, as shown in FIG. 4, to enable washer liquid to be discharged over a wide area of the windshield and also to shorten the distance that the washer liquid has to travel between the washer nozzle and the windshield.

Typically, with the above structure, the washer hose 11 connecting the washer tank and the washer nozzle 10 is disposed between the vehicle body and the wiper arm 1. A bent portion is formed at the base end of the washer hose and is bent in accordance with the arm oscillation (the bent portion is formed so as not to allow operation of large tensile force on the washer hose). The bent portion is generally disposed outside of the wiper arm. As a result, the appearance of the wiper arm can be particularly unattractive. In addition, problems have occurred due to the susceptibility of breakage of the bent portion of the hose by bending stresses or exposure to the outside, such as by being damaged when the vehicle is washed.

SUMMARY OF THE INVENTION

Accordingly, it is an object of the present invention to provide a washer base arrangement in a wiper arm device which overcomes the above-described problems in the prior art.

It is another object of the present invention to provide a washer hose arrangement which enables the appearance of the wiper arm to be considerably enhanced.

It is yet another object of the present invention to provide a washer hose arrangement which protects the washer hose from damage due to outside exposure.

These and other objects are attained by providing a washer hose arrangement having a wiper arm fixed at a base end to a wiper shaft protruding from a vehicle body; a washer nozzle is attached to the wiper arm to discharge washer liquid towards a vehicle windshield; a washer hose supplies washer liquid to the washer nozzle and protrudes from a position adjacent a portion of the wiper shaft and clear of an oscillation stroke of the wiper arm, the washer hose extends along the wiper arm and is connected at its other end to the washer nozzle; and an arm cover is attached to the base end of the wiper arm so as to cover the end portion of the washer hose.

In other aspects of the present invention, the cover is pivotally attached to the base end of the wiper arm; the arm cover may be adapted to cover a greater portion of the washer hose; and the position of the washer hose at its base end bisects the oscillation stroke of the wiper arm.

BRIEF DESCRIPTION OF THE DRAWINGS

Other objects and advantages will become apparent in view of the following detailed description of preferred embodiments when taken in conjunction with the accompanying drawings in which.

DETAILED DESCRIPTION OF PREFERRED EMBODIMENTS

Figure 1:
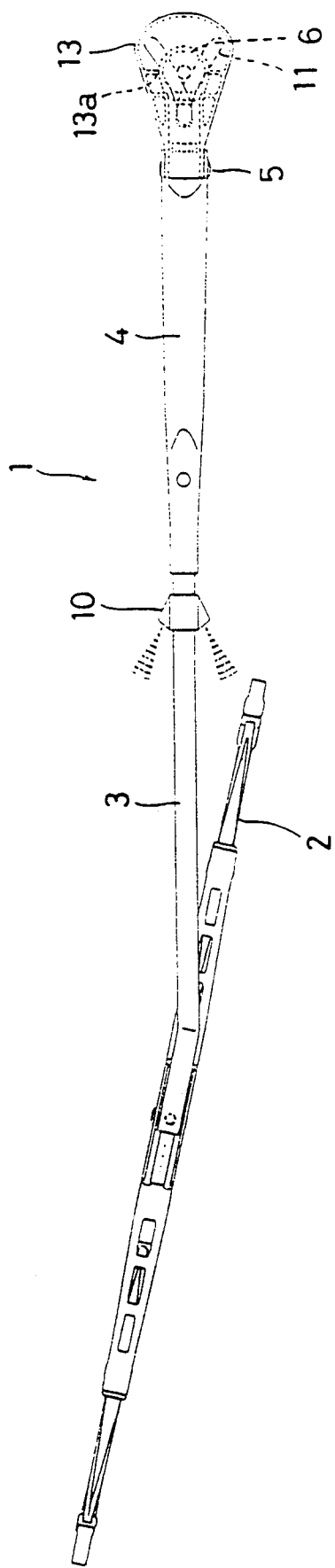
FIG. 1 is a plan view of a wiper arm of the present invention.
Figure 2:
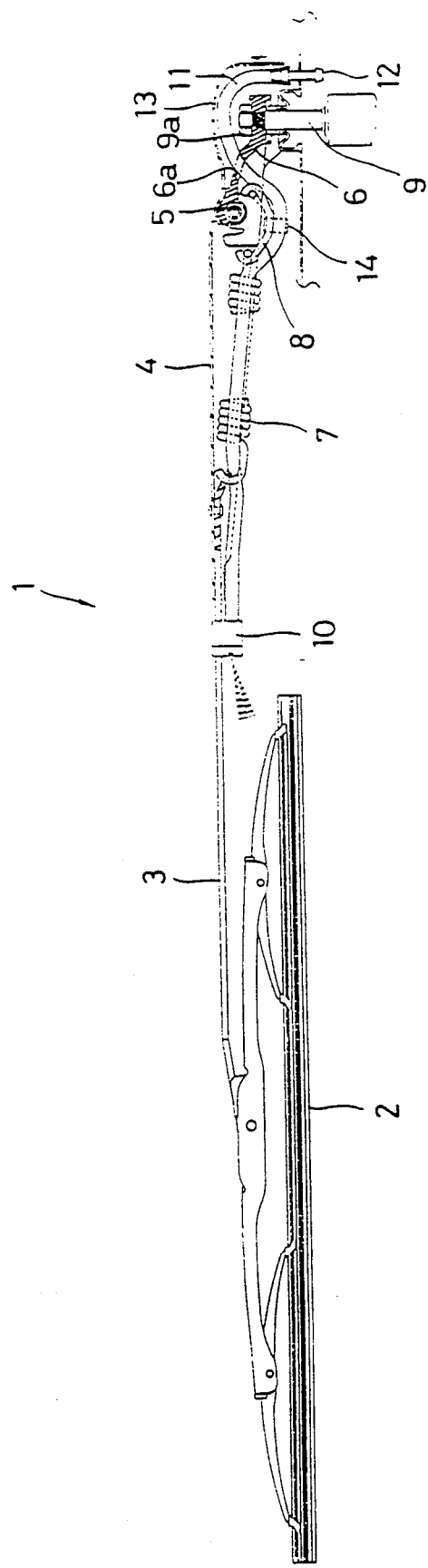
FIG. 2 is a partial sectional view of the wiper arm of FIG. 1.

A detailed description of a preferred embodiment of the present invention will now be given in conjunction with the accompanying drawings. A wiper arm 1 comprises an arm piece 3, where a blade 2 is secured to its base end portion; an arm shank 4 integrally supports the base end portion of the arm piece 3; a support 6 swingably supports the base end portion of arm shank 4 via a supporting shaft 5; and an arm spring 7 is disposed between the base end portion of arm piece 3 and an end portion of support 6. One end of arm spring 7 is connected to support 6 by means of a hook fitting 8. Arm spring 7 urges blade 2 in resilient contact with the windshield. The end portion of support 6 makes a serration fit with a wiper shaft 9. Arm 1 is oscillated by wiper shaft 9 to wipe the windshield.

A washer nozzle 10 includes a pair of discharging nozzles and is connected to a washer tank (not shown) through a washer hose 11 as will be described below. Washer nozzle 10 discharges washer liquid pumped from the washer tank to the windshield. Washer nozzle 10 is disposed in the base end portion of arm piece 3; therefore, when a washer switch (not shown) is turned on, washer liquid is discharged in accordance with an oscillating locus of wiper arm 1 and thereby covers a wide area of the windshield surface.

Figure 3:
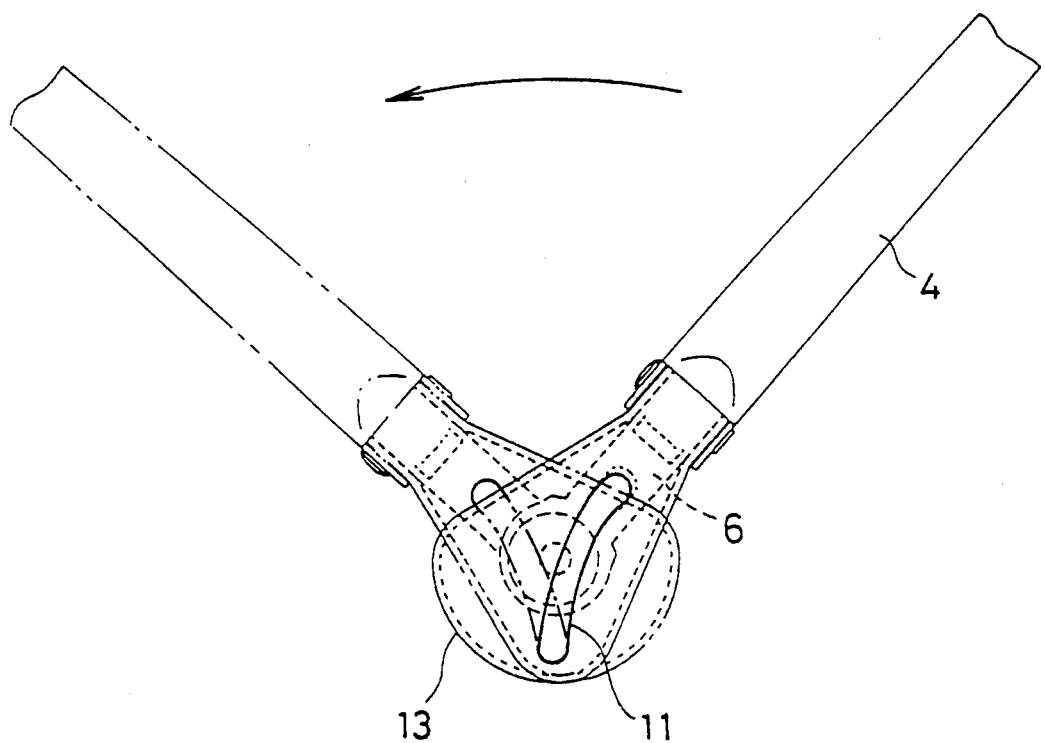
FIG. 3 is an enlarged plan view of an essential portion of the wiper arm of the present invention.
Figure 4:
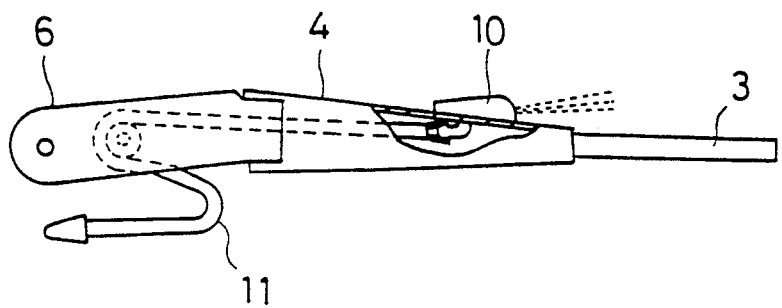
FIG. 4 is a plan view of a conventional wiper arm.

Washer hose 11 is formed of a flexible resin material, and a base end of the hose is connected by pressure to a hose connection 12 which protrudes through the vehicle body (the other end of hose connection 12 on the inner side of the vehicle body is connected to the washer tank through a hose member). Hose connection 12 is disposed in a position that is adjacent wiper shaft 9. In addition, hose connection 2 is located clear of the oscillating area of wiper arm 1, and is generally on the bisector of an oscillation angle of arm 1 (see FIG. 3). Washer hose 11, connected to hose connection 12, is disposed in such a manner that it passes by the upper end of wiper shaft 9 and reaches the underside of support 6 by running through a through-hole 6a provided in support 6. Moreover, washer hose 11 is fastened to hook fitting 8 by a clip 14 and passes by the inner peripheral portion of arm shank 4 which has a cross section of a bracket shape to hold washer hose 11 inside arm spring 7. Washer hose 11 terminates at washer nozzle 10. Accordingly, during the wiper oscillation of wiper arm 1, washer hose 11 can follow the oscillatory movement of wiper arm 1 due to the flexibility of the base end portion of washer hose 11 in the area of the upper end portion of wiper shaft 9 as shown in FIG. 3.

An arm cover 13 is supported by support shaft 5 swingable to an upper and lower position (hereinafter, regarding the arm cover 13, "the upper position" denoting when the arm cover 13 is opened, and "the lower position" denoting when it is closed). In the upper position, arm cover 13 can expose the wiper shaft connecting portion of support 6 to access a nut 9a from the exterior area. Arm cover 13 has a cross section of a bracket shape such that it covers the above-descried shaft connecting portion on its lower position. Ribs 13a protrude from the inside of cover 13 and engage a sidewall portion of support 6 by a press-fit, thus enabling arm cover 13 to be securely supported by support 6. Furthermore, arm cover 13 is expansively formed such that it can also cover the protruding portion of hose connection 12 outside the vehicle body and the base end portion of washer hose 11 which oscillates with wiper arm 1.

Since the base end portion of the washer hose 11 is not exposed to the outside, the appearance of the above-defined structure is considerably enhanced. In addition, the wiper arm device of the present invention can effectively prevent the washer hose of the exposed bent portion from being snagged or damaged due to its exposure to the outside, for example, such as when the vehicle is washed.

Still further, the base end portion of washer hose 11 of the present invention need not be bent nearly to the degree as in conventional washer arrangements. Therefore, bending stresses which cause washer hose breakage during the wiping oscillation of the wiper arm and which prevent the feeding of washer fluid through the washer hose, is avoided, thereby improving the reliability of the wiper.

Furthermore, the base end portion of washer hose 11 and the protruding portion of hose connection 12 are also covered by arm cover 13 Therefore, the arrangement is simplified in that no additional component-parts or structural complications are required.

In a preferred embodiment of the present invention, the protruding portion of hose connection 12 is disposed on the bisector of the oscillation angle of the arm so that the amount of deflection in the oscillation of washer hose 11 can be minimized, thereby improving durability.

The wiper arm of the present invention has the washer nozzle disposed in the wiper arm to discharge washer liquid onto the windshield. The base end portion of the washer hose, which is disposed along the wiper arm for providing washer liquid to the washer nozzle, protrudes from the position where it is adjacent the protruding portion of the wiper shaft and is clear of the oscillation area of the wiper arm so that it can oscillate in accordance with the arm oscillation.

Although the present invention has been described in detail, it will be apparent to those skilled in the art that various modifications may be made without departing from the scope of the invention, which is outlined in the following claims.

What is claimed is:

1. A wiper arm device, comprising:
   an elongated, rotatably mounted wiper shaft having an upper end protruding from a vehicle body, said wiper shaft defining a longitudinal pivot axis;
   a wiper arm having an elongated support, said support fixed at one end to said wiper shaft and pivotally supporting an arm shank at the other end by a support shaft, said support having an aperture therethrough, said arm being oscillatable with said shaft about said axis over an oscillation stroke, which defines an angle of oscillation;
   a washer nozzle attached to said wiper arm to discharge washer liquid towards a vehicle windshield; and
   an elongated washer hose for supplying said washer liquid to said washer nozzle, said washer hose having a first end portion protruding from the vehicle body at a position adjacent and spaced radially outwardly from said wiper shaft and unobstructed by said oscillation stroke of said wiper arm, said washer hose extending over said upper end of said wiper shaft, through said aperture in said support, along said wiper arm and being connected at a second end portion to said washer nozzle, wherein said position adjacent said wiper shaft is disposed on a bisector of said angle of oscillation of the wiper arm.

2. The wiper arm device of claim 1, further comprising an arm cover attached to said support shaft and covering said first end portion of said washer hose.

3. The wiper arm device according to claim 2, wherein said arm cover is pivotally attached to said support shaft for pivotal movement between upper and lower positions thereby enabling access to said washer hose and said wiper shaft in the upper position.

4. The wiper arm device according to claim 2, wherein said arm cover covers an additional portion of said washer hose beyond said first end portion, said additional portion oscillating with said wiper arm.

5. A wiper arm device, comprising:
   a wiper shaft having an upper end protruding from a vehicle body, said wiper shaft having a plane extending longitudinally therethrough to define two opposing sides of said wiper shaft;
   a wiper arm having an elongated support, said support being connected at one end to said upper end of said wiper shaft and pivotally supporting an arm shank at the other end by a support shaft, said support swingably supporting said arm shank about said support shaft for movement between an upper and lower position, said support and shank extending on one side of said plane and said support having an aperture therethrough;
   a washer nozzle attached to said wiper arm to discharge washer liquid towards a vehicle windshield;
   an elongated washer hose disposed on said device for supplying said washer liquid to said washer nozzle, said washer hose comprising:
   a first end portion protruding from the vehicle body at a position adjacent and spaced radially outwardly from said wiper shaft, said first end portion being disposed substantially parallel to said wiper shaft on the side of said plane opposite said support and shank, an intermediate portion of said washer hose extending from
said first end portion over said upper end of said wiper shaft and through said aperture in said support to an underside of said support shaft, said intermediate portion extending along said arm shank, and
a second end portion extending from said intermediate portion connected to said washer nozzle; and
an arm cover pivotally mounted on said support shaft and covering said first end portion of said washer hose and a portion of the intermediate portion of said washer hose disposed between said first end portion of said washer hose and said aperture in said support.

6. The wiper arm device according to claim 5 wherein said arm cover is pivotally attached to said other end of said support for pivotal movement between said upper and lower positions thereby enabling access to said washer hose and said wiper shaft when in the upper position.

7. The wiper arm device according to claim 5, wherein said wiper arm is oscillatable with said shaft over an oscillation stroke, which defines an angle of oscillation, and wherein said position adjacent said wiper shaft is unobstructed by the oscillation stroke of said wiper arm and is disposed on a bisector of said angle of oscillation of the wiper arm.

* * * * *